United States Patent [19]

Davis

[11] 3,709,698

[45] Jan. 9, 1973

[54] METHOD OF PREPARING CRISPY FOOD ITEMS

[76] Inventor: Edward E. Davis, 4265 San Francisco, St. Louis, Mo. 63115

[22] Filed: Jan. 12, 1970

[21] Appl. No.: 2,412

[52] U.S. Cl. ................................................. 99/107
[51] Int. Cl. ............................................. A22c 18/00
[58] Field of Search ........................................ 99/107

[56] References Cited

UNITED STATES PATENTS 3,429,713   2/1969   Nelson ................................. 99/107

OTHER PUBLICATIONS

Given, "Modern Encyclopedia of Cooking," 1949, Vol. II pp. 996, 1,118.
"The Gourmet Cookbook," 1950, page 433, article entitled Tripe Lyonnaise.

*Primary Examiner*—Hyman Lord
*Attorney*—Kingsland, Rogers, Ezell, Eilers & Robbins

[57] ABSTRACT

This is a method of preparing crispy barbecued snouts or snoots, tripe, pig ears and skins including the steps: cut out the two main tendons from the forehead to the tip of the nose of the snouts, and in all products trim excess fat and cut out all lean meat; cover product or products with water in a pot and boil for 30 minutes; season with a mixture of salt, red pepper, and garlic powder, and while keeping water in and over the products, boil for another 2 hours; strain off the water and fry in deep fat set at 375° F. a small increment at a time to insure floating, substantially 5 to 10 minutes, until snouts are firm enough to handle with tongs without tearing; lift snouts, etc., out individually with tongs, open up and put in a deep fry basket with another basket over them to maintain spread and reduce curling, replace in fryer and fry until crisp, substantially 15 to 20 minutes; remove the crispy snouts, etc., put in barbecue sauce, and serve.

6 Claims, No Drawings

METHOD OF PREPARING CRISPY FOOD ITEMS

BACKGROUND OF THE INVENTION

1. Field Of The Invention

The present invention relates to food preparation, and more particularly to a novel method of preparing crispy snouts, tripe, pig ears, pig skins, and the like, making these products highly desirable as food, especially when dipped in barbecue sauce at time of consumption.

2. Description Of The Prior Art

In the experience of the applicant, today snouts, pig ears, pig skins and tripe are simply put on a barbecue grill or in an oven and cooked until the grease runs out, doused in some barbecue sauce, or the like, and eaten. The end product is hard. This is not a delicacy, and more often than not, is eaten out of a matter of necessity rather than a desire to consume the products. Hence, there has long existed the need for a method of preparation of the concerned products which will render them highly palatable.

SUMMARY OF THE INVENTION

In brief, the present novel method of preparing crispy snouts, tripe, pig ears, pig skins, and the like, comprises removing the two main tendons of the snouts, trimming excess fat and lean meat from all concerned products, boiling immersed for substantially 30 minutes, seasoning and continuing to boil immersed for substantially two hours more, dipping the tripe in a flour base batter and frying all items in deep fat set at 375° F. in small floating increments for about 5 to 10 minutes, and placing individual pieces in a deep fry basket held against curling and returning to fryer where the product remains until crisp, which is around 15 to 20 minutes. Serve with barbecue sauce while hot and crisp, or place the crispy products in a plastic or wax bag and keep in a cool dry place for retaining crispness until ready for consumption.

Hence, objects of the present invention are to provide a method of preparing crispy snouts, tripe, pig ears, pig skins, and the like, in a manner palatable to the consumer, thereby fulfilling the long existing need in this cheap meat product art, which utilizes pig products and tripe heretofore discarded or often consumed from necessity rather than palatability, and which otherwise fulfills the objects and advantages sought therefor.

DESCRIPTION OF THE PREFERRED EMBODIMENT

Considering the present invention in detail, the present novel method of preparing crispy snouts, beef tripe, pig ears, pig skins, and the like, includes a number of steps. For snouts or snoots, the two main tendons running from the forehead to the tip of the nose are cut out. From all the products, the excess fat and lean meat are trimmed. The product, which may include one or more of the several items, is immersed in water in a pot and boiled for substantially 30 minutes. Seasoning comprising a mixture of salt, red pepper, and garlic powder, is added, and, while keeping adequate water in the pot and over the product, boiling continued for substantially another 2 hours. The water is strained off and the product is fried in deep fat set at 375° F. for about 5 to 10 minutes in small batches to insure floating of all items. The snouts and other items are firmed up enough by the deep fat frying for handling with tongs without tearing apart. The items are lifted out of the deep fat individually with tongs, and the like, opened up and spread out and put in a deep fry basket with another basket or other convenient wire structure pressing thereon to limit curling, returned to the deep fat fryer, and fried until crisp, which takes substantially 15 to 20 minutes. This final step results in crispy items which can be removed from the fry basket, put in barbecue sauce, and served. A highly palatable and delicious crispy food item which is not hard obtains from the described method. The crispy items may be eaten without the barbecue sauce.

It is desirable that the prepared product be eaten while crisp. Hence, it is advisable to store the crispy items in plastic or wax bags, or the like, in a cool place until ready to serve. When an order is received for the instant product, it is but necessary to apply barbecue sauce and serve.

It is manifest that there has been provided a novel method of preparing crispy snouts, tripe, pig ears, pig skins, and the like, which fulfills the objects and advantages sought therefor.

Various changes and modifications may be made within the method of this invention, as will be readily apparent to those skilled in the art. Said changes and modifications are within the scope and teaching of this invention as defined by the claims appended hereto.

What is claimed is:

1. A method of preparing crispy food items from a material selected from the group consisting of pig snouts, pig ears, pig skins, and beef tripe comprising the step of trimming excess fat and lean meat from said material, boiling said material for substantially 30 minutes, seasoning said boiled material and continuing to boil said material for substantially 2 hours, transferring the boiled material in small batches to a deep fat fryer set at substantially 375° F. and deep fat floating for substantially 5 to 10 minutes to firm the material, transferring said material to and spreading the same in a covered deep fry basket, and returning the basket to the deep fat fryer for substantially 15 to 20 minutes to make the said material crispy and ready for serving.

2. The method of claim 1 in which the material is pig snouts and the two main tendons are cut out prior to the first boiling step.

3. The method of claim 1 in which the seasoning step includes adding a seasoning made of salt, red pepper and garlic powder.

4. The method of claim 1 and including the step of applying a barbecue sauce to the crispy material.

5. The method of claim 1 in which the material is maintained against curling during the final deep fat frying step.

6. The method of claim 1 in which the material in beef tripe which is coated with a flour base batter prior to the first deep fat frying.

* * * * *